United States Patent Office 3,395,156
Patented July 30, 1968

3,395,156
1'-PHENYLSPIRO(CYCLOHEXANE-1,3'-INDOLINE)-2',4-DIONE
Milton Wolf, West Chester, and Albert A. Mascitti, Norristown, Pa., assignors to American Home Products Corporation, New York, N.Y., a corporation of Delaware
No Drawing. Filed Aug. 16, 1965, Ser. No. 480,115
1 Claim. (Cl. 260—325)

This invention relates to new and useful phenyloxindole derivatives as well as to the novel method for their preparation. In particular, the present invention is concerned with 1'-phenylspiro(cyclohexane-1,3'-indoline)-2',4-dione, which has therapeutic activity, and certain precursor compounds which are valuable intermediates.

The novel compounds which are included within the scope of this invention are represented by the following formula:

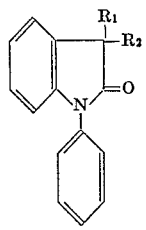

where $R_1$ and $R_2$ when taken separately are similar and selected from the group consisting of ethylenecarboxy and ethylenecarbo(lower)alkoxy; and when $R_1$ and $R_2$ are taken together, with the carbon atom to which they are attached, form a substituted cyclohexane ring selected from the group consisting of 4-ketocyclohexane and 3-carbo(lower)alkoxy-4-ketocyclohexane. Examples of such compounds include 1-phenyloxindole-3,3-dipropionic acid; diethyl-1-phenyloxindole-3,3-dipropionate; 1'-phenylspiro(3-carbethoxycyclohexane-1,3'-indoline)-2',4-dione and 1'-phenylspiro(cyclohexane-1,3'-indoline)-2',4-dione.

In accord with the process of the present invention, the compounds of this invention are synthesized by the following schematic sequence of reactions:

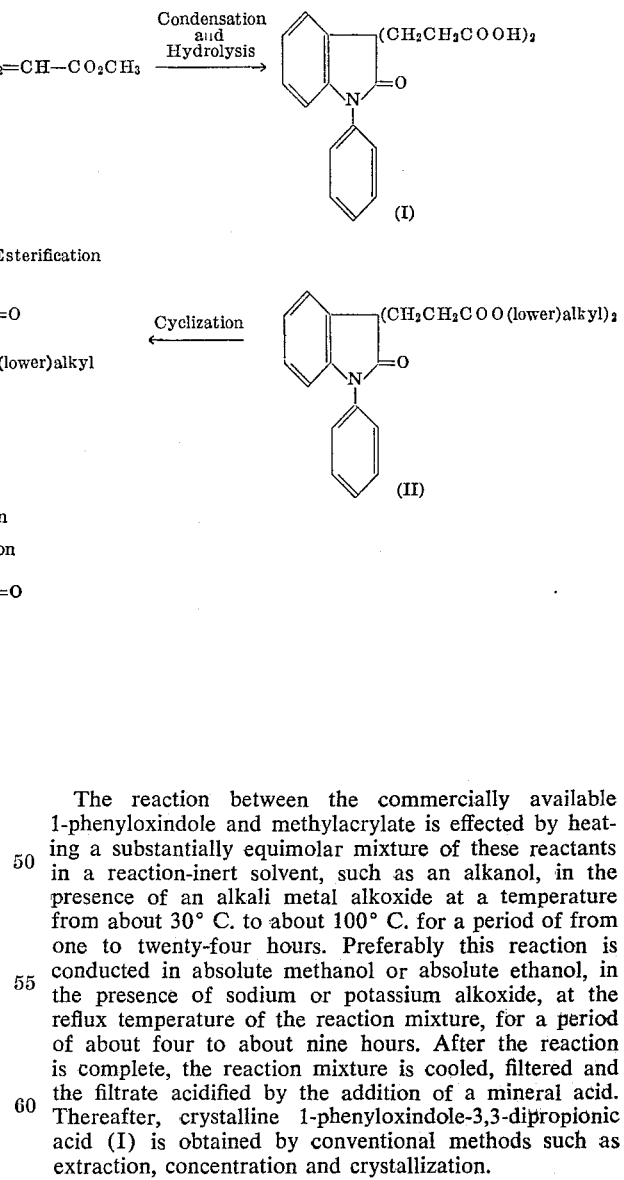

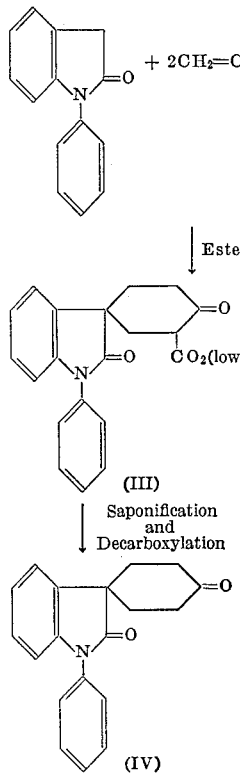

The reaction between the commercially available 1-phenyloxindole and methylacrylate is effected by heating a substantially equimolar mixture of these reactants in a reaction-inert solvent, such as an alkanol, in the presence of an alkali metal alkoxide at a temperature from about 30° C. to about 100° C. for a period of from one to twenty-four hours. Preferably this reaction is conducted in absolute methanol or absolute ethanol, in the presence of sodium or potassium alkoxide, at the reflux temperature of the reaction mixture, for a period of about four to about nine hours. After the reaction is complete, the reaction mixture is cooled, filtered and the filtrate acidified by the addition of a mineral acid. Thereafter, crystalline 1-phenyloxindole-3,3-dipropionic acid (I) is obtained by conventional methods such as extraction, concentration and crystallization.

Esterification of 1-phenyloxindole-3,3-dipropionic acid (I) may be effected by heating said compound in an alkanol acidified with a mineral acid at a temperature from about 25° C. to about 95° C. for a period of from two to thirty hours. The particular alkanol solvent employed will determine which ester is formed, for example, if ethanol is employed as the solvent the diethyl ester will be produced. Preferably this reaction is conducted in a benzene-lower alkanol solvent which has been acidified by the addition of a mineral acid, at the reflux temperature of the reaction mixture, for a period of about eight to about twelve hours. When esterification is complete, the di(lower)alkyl-1-phenyloxindole-3,3-dipropionate (II) may be obtained by conventional recovery procedures.

Cyclization of a di(lower)alkyl-1-phenyloxindole-3,3-dipropionate (II) is accomplished by heating the ester in a reaction-inert, water immiscible, organic solvent, in the presence of a hydride, at a temperature of from about 30° C. to about 100° C., for a period of from one to twenty-four hours. The preferred reaction is conducted in xylene, in the presence of sodium hydride, at the reflux temperature of the reaction mixture, for a period of about one to four hours. When the ring closure is complete, the reaction mixture is cooled by the addition of water and the immiscible layers separated. Thereafter, the aqueous layer is acidified by the addition of a mineral acid and the 1'-phenylspiro(3 - carbo(lower)alkoxycyclohexane - 1,3'-indoline)-2',4-dione (III) is obtained by extraction and concentration.

The above prepared 1'-phenylspiro(3 - carbo(lower)alkoxycyclohexane-1,3'-indoline)-2',4-dione (III) is then saponified and decarboxylated by refluxing this β-ketoester in an aqueous alkali metal hydroxide-alkanol mixture for a period of from thirty minutes to three hours. Preferably this conversion is conducted in an aqueous sodium hydroxide-ethanol solvent at the reflux temperature of the reaction mixture for a period of one hour. Thereafter, the ethanol is removed and 1'-phenylspiro(cyclohexane-1,3'-indoline)-2',4-dione is obtained as a colorless precipitate.

By reaction-inert organic solvent as employed herein is meant an organic solvent which dissolves the reactants and will not prevent or interfere with their interaction. The terms lower alkanol, lower alkyl and lower alkoxy refer to compounds or moieties having from one to seven carbon atoms. A hydride, as employed herein, defines a compound which upon disassociation has reducing properties and can donate a hydride ion ($H^-$) to a second molecule. Mineral acids which may be employed in the process of this invention are exemplified by the following: hydrochloric acid, hydrobromic acid, hydroiodidic acid, nitric acid, sulfuric and phosphoric acid. The time and temperature ranges given above are interrelated, in that the reaction time is dependent upon the rate and temperature of heating.

In accord with the present invention, the aforementioned 1-phenyloxindole-3,3 - dipropionic acid; the di-(lower)alkyl-1-phenyloxindole-3,3-dipropionates; and the 1'-phenylspiro(3-carbo(lower)alkoxycyclohexane-1,3 - indoline)-2',4-dione are all valuable intermediates in the synthesis of 1'-phenylspiro(cyclohexane-1,3'-indoline)2',4-dione, which has been found to possess interesting pharmaceutical properties which render it useful as a synthetic medicinal. More particularly, this latter compound has exhibited utility as a potent analgesic.

When 1'-phenylspiro(cyclohexane-1,3'-indoline)-2',4-dione is employed as an analgesic, it may be administered alone or in combination with pharmaceutically acceptable carriers, the proportion of which is determined by the solubility and chemical nature of the aforesaid compound, the route of administration and standard pharmaceutical practice. For example, it may be administered orally in the form of tablets or capsules containing such excipients as starch, milk sugar, certain types of clay and so forth. It may be administered sublingually in the form of troches or lozenges in which the active ingredient is mixed with sugar and corn syrups, flavoring agents and dyes; and then dehydrated sufficiently to make it suitable for pressing into a solid form. It may be administered orally in the form of a solution which may contain coloring and flavoring agents or it may be injected parenterally, that is intramuscularly, intravenously or subcutaneously. For parenteral administration it may be used in the form of a sterile solution containing other solutes, for example, enough saline or glucose to make the solution isotonic.

The dosage of the present therapeutic agent will vary with the form of administration. Furthermore, it will vary with the particular subject under treatment. It will generally be found that when the compostiion is administered orally, larger quantities of the active agent will be required to produce the same effect as a smaller quantity given parenterally. In general, the compound of this invention is most desirably adminstered at a concentration level that will generally afford effective results without causing any harmful or deleterious side effects and preferably at a level that is in the range of from about 1 mg. to about 10 mg. per kg. of body weight per day, although as aforementioned, variations will occur. However, a dosage level that is in the range of from about 1 mg. to about 5 mg. per kg. of body weight per day is most desirably employed in order to achieve effective results.

The following examples are given by way of illustration and are not to be construed as limitations of this invention, many variations of which are possible without departing from the scope.

EXAMPLE I 1-phenyloxindole (40.0 g., 0.24 m.) is added to a solution of metallic sodium (5.5 g.) in absolute ethanol (500 cc.) in a nitrogen atmosphere. Methylacrylate (41.2 g., 0.48 m.) is added dropwise with stirring to this solution. A mildly exothermic reaction is observed. After the addition is complete, the reaction mixture is refluxed under nitrogen for six hours. Metallic sodium (5.5 g.) dissolved in 95 percent ethanol (200 cc.) is added and the mixture refluxed for an additional hour. The insoluble material is separated by filtration, and the filtrate concentrated in vacuo. The residue is dissolved in water, filtered, and the aqueous filtrate acidified with conc. hydrochloric acid. The solid product is collected by filtration, washed with water and dried. Yield of crude product is 58 g. (68.5 percent). Recrystallization of the crude product from absolute ethanol (Darco G–60), produces colorless crystals of 1-phenyloxindole-3,3-dipropionic acid (24.0 g., 28.4 percent), M.P. 208–210° C. (uncorr.); second crop (23.0 g., 27.2 percent), M.P. 200–5° C. (uncorr.).

*Analysis.*—Calcd. for $C_{20}H_{19}NO_5$: C, 67.90; H, 3.98; N, 3.98. Found: C, 67.16; H, 5.44; N, 4.07.

The above procedure is repeated to produce the above compound utilizing metallic potassium instead of metallic sodium.

EXAMPLE II 1-phenyloxindole (20.0 g.) is added to a solution of metallic potassium (2.7 g.) in absolute methanol (250 cc.) in a helium atmosphere. Methylacrylate (20.5 g.) is added to the solution slowly with agitation and the reaction mixture is refluxed for 10 hours. Metallic potassium (2.7 g.) dissolved in methanol (100 cc.) is added and the mixture is refluxed for an additional 30 minutes. Upon cooling, the insoluble material is separated by filtration and the filtrate is concentrated by evaporation. The residue is dissolved in water and the solution is acidified with sulfuric acid. The product obtained, in this manner is 1-phenyloxindole-3,3-dipropionic acid.

EXAMPLE III 1-phenyloxindole-3,3-dipropionic acid (47.0 g., 0.13 m.) in a 1:1 mixture of ethanol-benzene (600 cc.) containing concentrated hydrochloric acid (5–6 drops) is refluxed for ten hours while slowly distilling off the solvent. The solvent is removed in vacuo affording an oily residue which crystallized on storage at room temperature. The yield of diethyl-1-phenyloxindole-3,3-dipropionate, as a colorless solid, is 38.5 g. A sample recrystallized from hexane melts at 54–56° C. (uncorr.).

*Analysis.*—Calcd. for $C_{24}H_{27}NO_5$: C, 70.39; H, 6.65; N, 3.41. Found: C, 71.59; H, 6.53; N, 3.93.

In a similar manner, when the above reaction is conducted in a 1:1 mixture of methanol-benzene, the product is dimethyl-1-phenyloxindole-3,3-dipropionate.

EXAMPLE IV 1-phenyloxindole-3,3-dipropionic acid (25 g.) in a 1:1 mixture of butanol-benzene (300 cc.) containing concentrated phosphoric acid (5–6 drops) is refluxed for fifteen hours while slowly distilling off the solvent. When the reaction is completed, the remaining solvent is removed under vacuum and the residue is dibutyl-1-phenyloxindole-3,3-dipropionate.

EXAMPLE V

A mixture of diethyl-1-phenyloxindole-3,3-dipropionate (38.5 g., 0.090 m.) and sodium hydride (5.0 g. of a 50 percent dispersion in white mineral oil 0.090 m.) in xylene (400 cc.) is refluxed for two hours. Water (50 cc.) is added to the cooled reaction mixture, and the xylene layer separated and discarded. The aqueous layer is acidified and the product extracted with benzene. The extract is dried over anhydrous sodium sulfate and concentrated in vacuo affording an oily residue (33.5 g.) of 1'-phenylspiro(3-carbethoxycyclohexane-1,3-indoline)-2',4-dione which hardened into a solid on standing.

In a similar manner, 1'-phenylspiro(3-carbomethoxycyclohexane - 1,3' - indoline) - 2',4 - dione and 1'-phenylspiro(3 - carbobutoxycyclohexane - 1,3' - indoline) - 2',4-dione are synthesized.

EXAMPLE VI

1'-phenylspiro(3-carbethoxycyclohexane-1,3'-indoline)-2',4-dione (34.0 g.) is admixed with a mixture of 150 cc. of 2 N aqueous sodium hydroxide and 200 cc. of ethanol and refluxed for one hour. The alcohol is removed by distillation in vacuo, and the product separates from the aqueous solution as a colorless solid; recrystallization from absolute ethanol affords colorless crystals of 1' - phenylspiro(cyclohexane - 1,3' - indoline) - 2',4-dione (9.0 g.) M.P. 184–6° C. (uncorr.).

*Analysis.*—Calcd. for $C_{19}H_{17}HO_2$: C, 78.29; H, 5.88; N, 4.80. Found: C, 78.11; H, 5.99; N, 4.83.

The above procedure is repeated to produce the aforesaid compound utilizing an aqueous potassium hydroxide and methanol mixture.

EXAMPLE VII

1' - phenylspiro(3 - carbomethoxycyclohexane - 1,3'-indoline)-2',4-dione (20.0 g.) is admixed with a mixture of 100 cc. of 1 N aqueous potassium hydroxide and 150 cc. of propanol and refluxed for 4 hours. The alcohol is removed under vacuum and the product precipitates. In this manner, 1'-phenylspiro(cyclohexane-1,3'-indoline)-2',4-dione is produced.

Similarly, the above product may be obtained from 1' - phenylspiro(3 - carbobutoxycyclohexane - 1,3' - indoline)-2',4-dione.

What is claimed is:
1. 1' - phenylspiro(cyclohexane - 1,3' - indoline) - 2',4-dione.

References Cited
UNITED STATES PATENTS 3,188,313  6/1965  Archer _____ 260—326.14

OTHER REFERENCES

Julian et al.: Jour. Amer. Chem. Soc., vol. 75, 1953, pp. 5301–5305.

Lloyd et al.: Jour. Amer. Chem. Soc., vol. 76, 1954, pp. 3651–3653.

Palazzo et al.: Gazz. Chim. Ital., vol. 82, 1952, pp. 211–223.

Palazzo et al.: Gass. Chim. Ital., vol. 82, 1952, pp. 584, 587, 589 and 593.

NICHOLAS S. RIZZO, *Primary Examiner.*

J. A. NARCAVAGE, *Assistant Examiner.*